Aug. 14, 1973  G. J. HAHN  3,752,687

TITANIUM DIOXIDE MIXING

Filed Nov. 10, 1969

INVENTOR
GRANVILLE J. HAHN
BY
*Sol B. Wicks*
ATTORNEY

United States Patent Office 3,752,687
Patented Aug. 14, 1973

3,752,687
TITANIUM DIOXIDE MIXING
Granville J. Hahn, Big Spring, Tex., assignor to Cosden Oil & Chemical Company, Big Spring, Tex.
Continuation-in-part of application Ser. No. 525,949, Feb. 8, 1966. This application Nov. 10, 1969, Ser. No. 875,184
Int. Cl. C09c 1/36
U.S. Cl. 106—300        2 Claims

ABSTRACT OF THE DISCLOSURE

Discoloration of white titanium dioxide during mixing, milling or blending by abrasive discoloration by metallic parts of the mixer are prevented by coating or plating the mixing bowl and mixing elements with very hard material exceeding about eight mohs such as tungsten carbide or other hard carbide materials.

---

Figure 1:
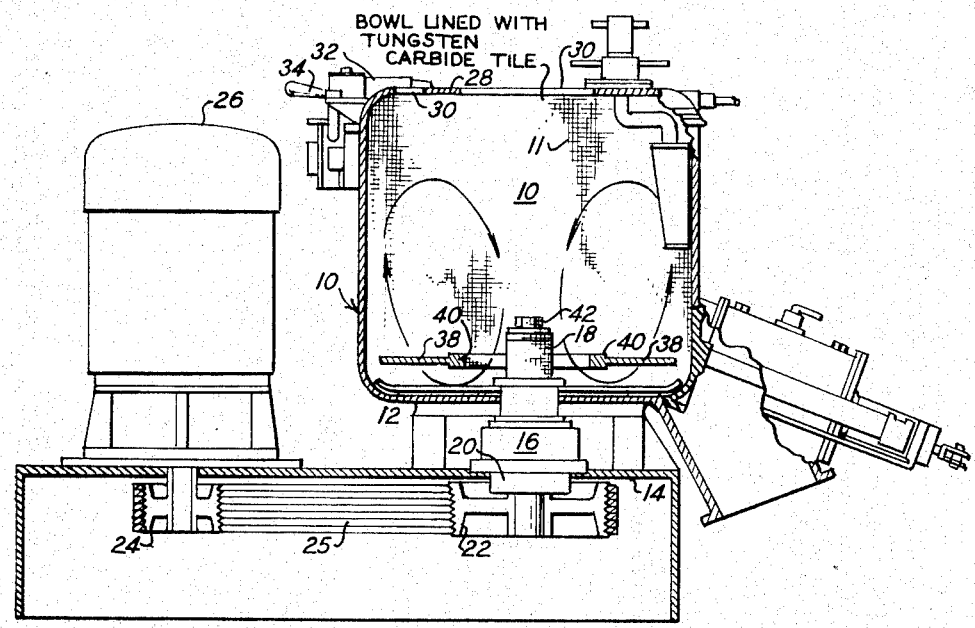

This application is a continuation-in-part of copending application, Ser. No. 525,949, filed Feb. 8, 1966, now U.S. Pat. No. 3,492,265.

This invention relates to preventing discoloration of titanium dioxide during mixing, milling or blending of the titania with other substances such as liquids or dry particles such as plastic particles with which it is often mixed in order to pigment the plastic particles or suspend the titania in the liquid.

More particularly, this invention relates to the mixing of the titania with various substances to be pigmented in a mixer having its surface elements smoothly coated with abrasion resistant surfacing materials having a moh hardness exceeding about 8, typically hard inorganic carbides.

As described in my parent application, when titania is mixed in conventional mixers having metal surfaces, typically any ferrous metal, commonly nickel or stainless steel, the titanium dioxide worked as by mixing, blending or milling by abrasive contact with such surfaces becomes gray, slightly discolored from the brilliant white inherent in titania.

In applications of light pigment comprising titanium dioxide to dry plastic particles, usually used for molding, the product is mixed abrasively in contact with mixer surfaces including milling and blending with or without substantial pressure, whereby there is substantial abrasive contact between the metal surfaces of the mixing device, usually of ferrous metal and the titania-containing composition, which results in rubbing off some metal thus causing a substantial graying of the brilliant white titania or other light or carefully selected pastel-colored shades thereof.

The coloring is found to be imparted by the abrasive contact of the titania composition with the surfaces of the mixing or milling device. The metal component of such devices are usually iron or a typical alloy or plating metal thereof, from which mixing blades or mixing bowls are normally formed, such as chromium, nickel, zinc and the like. In a typical case it is found that high speed mixing devices such as a rapidly rotating blade mixer imparts a gray discoloration to the pigment from this abrasive contact.

According to the present invention it is found that the normal graying of titania pigment compositions and products which are light pigmented with titanium dioxide during their working to blend the titania pigment into a homogeneous dispersion throughout the body to be pigmented is prevented by working in a hard-surfaced mixer.

In typical operation, according to the invention, various solid plastics, for instance, crystal bead polystyrene particles, graft polymerized polystyrene with natural or synthetic rubber particles and other particles such as polyvinyl chloride, polyvinyl acetate and mixed polyvinyl chloride acetate, polyvinyl acetal, cellulose ester and ethers, polyesters of phthalic and terephthalic acid with glycols and glycerols, polyacrylonitriles, polyamides and the like; typically, plastic solids used in molding or coating compositions, sometimes modified with each other as blends, and copolymers thereof, as known in the art, may be blended for white or light pigmentation with titanium dioxide. Such plastic particles may be pigmented with titanium dioxide or pigmented with light titania-modified light pastel colors; that is, a blend of titanium oxide with modifying pigments in which titania is the predominant pigment substance. Such dry molding or coating composition is normally blended, milled or mixed, often under high pressure or at high speed, in mixing or milling devices operating with large or long abrasive contact of the working surfaces of the mixer with the composition being worked, and/or blended, in a manner which abrasively imparts a graying of the titania.

According to this invention the graying of the titania pigmented product is prevented by coating of the mixing device with such hard abrasion resistant substances as listed above. Typically the abrasion resistant substance in the form of small molded platelets in various geometric shapes such as rectangular, hexagonal or the like tiles are cemented and/or inlaid upon the surface of the mixing bowl surface as well as upon those portions of the mixing blade or mixing parts as come into abrasive contact with the titania containing composition being mixed therein.

It appears, without desiring to be limited to theory, that the titania during admixture in an ordinary mixing device having metallic surfaces such as blades, mixing arms, milling rollers or the like have some of the metal such as iron and nickel rubbed off in the abrasive mixing, abraded as dust-like metal which when mixed with the titania has a darkening or graying effect upon it. The use of such hard abrasion resistant materials prevents the abrasive rubbing off of the surface substance of the mixer which comprises such materials, and, because of this high abrasion resistance, the titania mixed in such mixing device remains relatively colorless; that is, it maintains its initial bright white color to a greater degree than was available according to prior art practices.

Figures 2, 3:
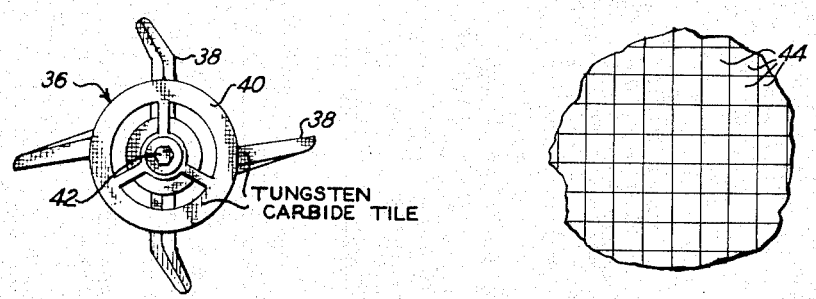

To illustrate the practice of this invention, a commercial Prodex-Henschel mixer which comprises merely a tank and a stainless steel mixing blade mounted near the bottom to a hub projected upward from the bottom for driving is shown in the attached drawing wherein:

FIG. 1 is a section through the mixer;
FIG. 2 is a plan view of the mixing blade; and
FIG. 3 is an enlarged detail of arrangement of square tile-like platelets as they would appear inlaid upon the surface of the mixing bowl or upon the mixing blade.

The mixer comprises a tank or bowl 10 having a bottom 12 supported on a base 14 above which projects a driving hub 16 having its inner end 18 projecting through the bottom 12. Its outer end 20 supports a driving pulley 22 cooperating with the driving pulley 24 of a driving motor 26 which imparts rotary drive to the pulley 22 by way of driving belt 25. The upper end of the tank 10 may be enclosed with a permanent cover 28 having openings 30 covered by removable plates 32 secured by quick-acting locks or latches 34. The mixing impeller 36 shown in FIG. 2 consists of four blades 38 supported from an impeller ring 40 fastened by a nut 42 to the inner end of the hub 18. The Prodex-Henschel mixer, here described, is operated at variable speeds from 400 to 3850 revolutions per minute and has a tip speed of 100 to 500 inches per second controllably ranging upward to 1500 inches per second. At very low speeds very little grayness is imparted to the mix except over long periods of time. At high speeds ordinarily used, substantial graying of titania pigment mixed in this kind of mixer would take place.

According to the present construction the titania contact surfaces such as the inner surface of the bowl 10 is covered by tungsten carbide tiles 11. Such tiles are also cemented upon the mixing impeller blades 38. Other contacting portions including the hub 18 are each also coated with the small tungsten carbide tiles inlaid upon or cemented. Thus the entire exposed blade and bowl surfaces are covered with tungsten carbide tiles. Such tiles are shown in FIG. 3. The tiles of FIG. 3 are little squares 44 inlaid as a typical mosaic of rectangular tiles whereby FIG. 3 represents an enlarged detail of any of the surfaces 10 or 38 referred to above.

The hard abrasive tiles forming the suface will protect the titania against inclusion of abraded substances normally forming the surface of such mixer as shown in FIGS. 1 and 2. This type of mixer is typically exemplary of other mixers which could be used for abrasive mixing of titania and contain substances with which it is usually compounded for pigmentation thereof. However, other mixing devices useful for such blending of titania could similarly be coated with hard abrasive such as tungsten carbide molybdenum carbide, silicon carbide and corundum in the form of tiles, plates or the like, to protect the titania against discoloration during abrasive contact with such surfaces.

EXAMPLE I

The mixer as shown in the drawings was completely coated on all surfaces with cemented tiles to form a continuous tungsten carbide surface exposure for admixture of a titania composition. A series of runs were made in which five pounds of water-white polystyrene beads averaging about 60 mesh in size were mixed with a pigmenting quantity such as about 2% by weight of titanium dioxide in the high intensity mixer shown in the drawing. For these test purposes the mixer was operated at 3800 r.p.m., producing a tip speed of 700 inches per second for an arbitrary period of three minutes. The degree of grayness was measured by an arbitrary scale ranging from 0 to 10, the 0 value being for the whitest, the 5 value being a control mixing applied in a normal three minute run using the typical Henschel mixer whose surfaces were not abrasive coated, and the value of 10 being the extreme gray color imparted by operating the control for seventeen minutes in the same uncoated mixer. The temperature was controlled during the mixing so that the composition in the mixer never exceeded 110° F. The gray discoloration in numerous tests was analyzed by washing the mixture with 6 N HCl to extract the gray and the extract was analyzed to contain small amounts of nickel, although it was mostly iron, usually the free metallic form, although some of the metal was possibly present in the oxide form comprising the original mixer surface.

The following table illustrates the results of testing, pointing out and listing the results in degrees of graying by the scale as set forth above. Runs 1 and 2 were in the control mixer and runs 3 and 4 in the tungsten carbide coated mixer.

TABLE 1

| Run number | Time, minutes | R.p.m. | $TiO_2$ crystalline in grams | Degree of gray |
|---|---|---|---|---|
| 1 | 3 | 3,800 | 45.5 | 5 |
| 2 | 17 | 3,800 | 45.5 | 10 |
| 3 | 3 | 3,800 | 45.5 | 0 |
| 4 | 17 | 3,800 | 45.5 | .1 |

It will be evident by the variation in the time of mixing that the degree of graying varies with the time of mixing in each instance and reflects the larger quantity of iron abraded from the surface of the uncoated mixer.

EXAMPLE II

The advantages of the present hard carbide bowl is also illustrated by comparing the analyzed iron content of the titania mixed in a commercial Prodex-Henschel mixer as shown in the drawings but whose surfaces are not coated with tungsten carbide with the iron content of titania mixed in the tungsten carbide coated mixer of the present invention.

TABLE 2

[Iron content as a function of mixing time. Sample contains 2% $TiO_2$]

| | Degree of grayness | | | Total iron, p.p.m. | |
|---|---|---|---|---|---|
| Time mixed | Commercial mixer | WC coated mixer | Ferric iron, p.p.m. | Commercial mixer | WC coated mixer |
| 30 seconds | 1 | [1] 0.1 | 2.4 | 2.7 | [1] 0.1 |
| 3 minutes | 5 | 0.1 | 2.6 | 6.3 | 0.1 |
| 6 minutes | 7 | 0.1 | 4.2 | 7.7 | 0.1 |
| 10 minutes | 8 | 0.1 | 5.0 | 14.5 | 0.1 |
| 17 minutes | 10 | 0.1 | 7.6 | 52.3 | 0.1 |

[1] The quantity of iron as well as the change in color are at or near limit of accuracy of analysis. Practically there is no change in color and no iron.

As thus described the graying effect of titania pigment imparted during its intensive working or blending with titania carriers to be blended therewith, is found to be substantially improved by effecting the mixing in a hard abrasive coated mixer whereby the surface substance of the mixer resists removal during the abrasive mixing. The mixing of the titania may be with other solid or liquid substances either to form a molding or coating composition pigmented with titanium dioxide. The treatment may be applied to titania pigmented compositions even where the color has been slightly modified to other pastel colors sensitive to graying and largely colored by a substantial content of titanium dioxide in a mixture of pigments.

The invention may be used despite substantial variation in the type of mixer and the intensity or abrasive effect imparted thereby. Thus it would be useful where the mixing velocity is higher or relatively low to use slow moving mixing devices where substantial pressures are applied, or the mixing is applied over a long period of time and produces substantial abrasion.

Accordingly it is intended that such variations as will be apparent to one skilled in the art are intended to be included.

What is claimed is:

1. The method of mixing titania with blending components for brilliant white titanium dioxide pigmentation thereof to produce a brilliant white titanium pigmented mixture comprising mixing said titania and blending components in a bowl with mixing elements having abrasion resistant surfaces of a hardness of at least about eight mohs selected from the group consisting of tungsten carbide, molybdenum carbide, silicon carbide and corundum.

2. The method as defined in claim 1 wherein the blending components to be mixed with the brilliant white titanium dioxide pigment are plastic solids.

References Cited

UNITED STATES PATENTS 2,591,988  4/1952  Willcox _____ 106—300
3,451,834  6/1969  Kerry et al. _____ 106—300

JAMES E. POER, Primary Examiner